(12) United States Patent
Deura et al.

(10) Patent No.: US 11,999,170 B2
(45) Date of Patent: Jun. 4, 2024

(54) IMAGE RECORDING DEVICE AND COMPUTER READABLE MEDIUM

(71) Applicant: BROTHER KOGYO KABUSHIKI KAISHA, Nagoya (JP)

(72) Inventors: Yushi Deura, Nagoya (JP); Shinya Esaki, Nagoya (JP); Shunsuke Minamikawa, Nagoya (JP); Tetsuya Okuno, Nagoya (JP); Haruka Azechi, Nagoya (JP); Tony Lee, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 295 days.

(21) Appl. No.: 17/486,997

(22) Filed: Sep. 28, 2021

(65) Prior Publication Data

US 2022/0009242 A1  Jan. 13, 2022

Related U.S. Application Data

(63) Continuation of application No. PCT/JP2020/013604, filed on Mar. 26, 2020.

(30) Foreign Application Priority Data

Mar. 28, 2019 (JP) .................. 2019-063835

(51) Int. Cl.
*B41J 2/175* (2006.01)

(52) U.S. Cl.
CPC ....... *B41J 2/17546* (2013.01); *B41J 2/17513* (2013.01); *B41J 2/17526* (2013.01); *B41J 2/17566* (2013.01); *B41J 2002/17589* (2013.01)

(58) Field of Classification Search
CPC ............... B41J 2/17546; B41J 2/17513; B41J 2/17526; B41J 2/17566; B41J 2002/17589; B41J 2/14543; G03G 15/5091
See application file for complete search history.

(56) References Cited

U.S. PATENT DOCUMENTS

2009/0016743 A1   1/2009 Tye et al.
2014/0023382 A1*  1/2014 Kawana ............. G03G 15/5079
                                                   399/8
2017/0046105 A1   2/2017 Masui

FOREIGN PATENT DOCUMENTS

JP    2001-331069 A    11/2001
JP    2006-208725 A     8/2006
(Continued)

OTHER PUBLICATIONS

International Search Report dated Jun. 16, 2020 issued in PCT/JP2020/013604.
(Continued)

*Primary Examiner* — Geoffrey S Mruk
(74) *Attorney, Agent, or Firm* — Scully, Scott, Murphy & Presser, P.C.

(57) ABSTRACT

An image recording device includes a cartridge mount to which a cartridge is mounted, a cartridge interface, a memory, a communication interface, a print engine configured to execute printing, and a controller. The controller is configured to obtain a transmission address stored in a cartridge memory of the cartridge through the cartridge interface, store the obtained transmission address in the memory, obtain, from the memory, notification information including at least one from a group of remaining amount information indicating a remaining amount of consumable in the cartridge mounted to the cartridge mount, order information indicating an order for the cartridge and status (Continued)

information indicating a state of the print engine, and transmission source information, and transmit the obtained notification information and the obtained transmission source information to the obtained transmission address through the communication interface.

9 Claims, 10 Drawing Sheets

(56) References Cited

FOREIGN PATENT DOCUMENTS

| | | |
|---|---|---|
| JP | 2008-310617 A | 12/2008 |
| JP | 2017-38257 A | 2/2017 |

OTHER PUBLICATIONS

Japanese Notice of Reasons for Refusal dated Nov. 1, 2022 from related JP 2019-063835 together with an English language translation.
International Preliminary Report on Patentability together with the Written Opinion dated Sep. 28, 2021 from related PCT/JP2020/013604.

* cited by examiner

IMAGE RECORDING DEVICE AND COMPUTER READABLE MEDIUM

CROSS-REFERENCE TO RELATED APPLICATIONS

This is a Continuation of International Application No. PCT/JP2020/013604 filed on Mar. 26, 2020, which claims priority from Japanese Patent Application No. 2019-063835 filed on Mar. 28, 2019. The entire disclosures of the prior applications are incorporated herein by reference.

BACKGROUND

Technical Field

Aspects of the present disclosure relate to a technique in which an image recording device transmits information that changes due to printing to an information processing device of a service provider based on a contract between the service provider and a user.

Related Art

There has been known an image recording device that transmits information such as a remaining amount of a consumable item that changes due to printing to a service provider. This image recording device includes a memory that stores contact information of a service base for each area. When installing the image recording device, an operator inputs area information of the installation place to the image recording device. The image recording device extracts a contact address corresponding to the inputted area information, registers the extracted contact address, and transmits information to the registered contact address.

SUMMARY

When installing the above-described image recording device, the operator needs to input the area information of the installation place to the image recording device.

According to aspects of the present disclosure, there is provided an image recording device including a cartridge mount to which a cartridge is mounted, a cartridge interface, a memory, a communication interface, a print engine configured to execute printing, and a controller. The controller is configured to obtain a transmission address stored in a cartridge memory of the cartridge through the cartridge interface, store the obtained transmission address in the memory, obtain, from the memory, notification information including at least one from a group of remaining amount information indicating a remaining amount of consumable in the cartridge mounted to the cartridge mount, order information indicating an order for the cartridge and status information indicating a state of the print engine, and transmission source information, and transmit the obtained notification information and the obtained transmission source information to the obtained transmission address through the communication interface.

According to aspects of the present disclosure, there is further provided a non-transitory computer-readable medium storing computer-readable instructions configured to, when executed by a controller of an image recording device comprising a cartridge mount to which a cartridge is mounted, a cartridge interface, a memory, a communication interface, and a print engine configured to execute printing, cause the controller to obtain a transmission address stored in a cartridge memory of the cartridge through the cartridge interface, store the obtained transmission address in the memory, obtain, from the memory, notification information including at least one from a group of remaining amount information indicating a remaining amount of consumable in the cartridge mounted to the cartridge mount, order information indicating an order for the cartridge, and status information indicating a state of the print engine and transmission source information, and transmit the obtained notification information and the obtained transmission source information to the obtained transmission address through the communication interface.

BRIEF DESCRIPTION OF THE ACCOMPANYING DRAWINGS

DETAILED DESCRIPTION

Hereinafter, embodiments of the present disclosure will be described. It is noted that the embodiments described below are merely examples of the present disclosure, and it goes without saying that the embodiments of the present disclosure can be modified appropriately without changing the scope of the present disclosure. It is also noted that aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Figure 1:
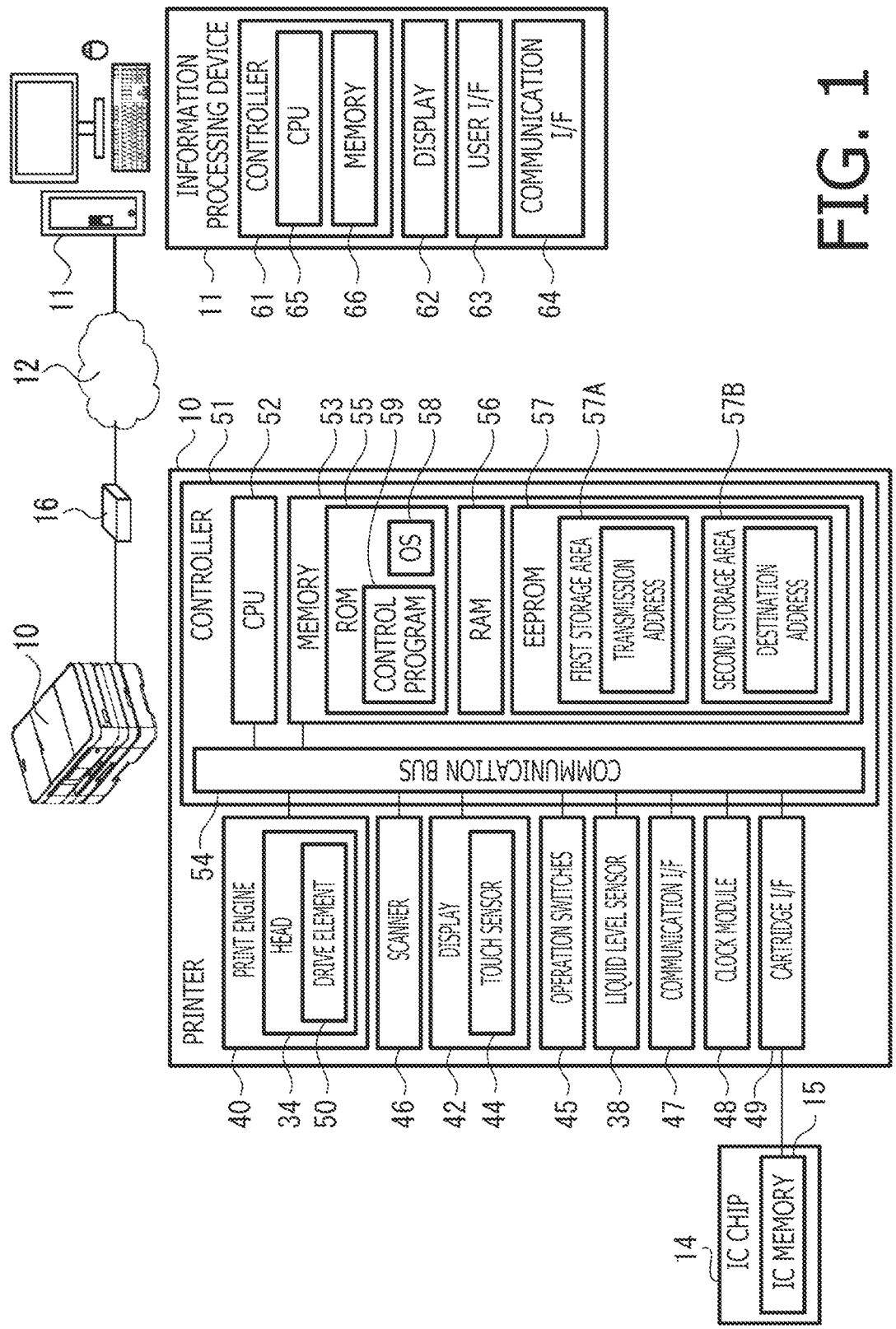
FIG. 1 is a functional block diagram of a printer and an information processing device.

In the present embodiment, as shown in FIG. 1, a printer 10 connected to the Internet 12 will be described. The printer 10 is connected to the Internet 12 via a local network such as a Local Area Network (LAN) and a router 16. Alternatively, the printer 10 is connected to the Internet 12 via a not-shown personal computer and the router 16. The printer 10 is connected to the personal computer by a communication cable such as a USB cable.

Also, the printer 10 may transmit audio signals and/or image data to the Internet 12. That is, the printer 10 may be a multifunction peripheral with which a function such as a call function and/or a FAX function can be used through the Internet 12. It is noted that the printer 10 may be connected to the Internet 12 and a telephone line. The printer 10 has a function of transmitting an e-mail to the Internet 12. The e-mail transmitted by the printer 10 is received by an information processing device 11 through a mail server.

The information processing device 11 is a personal computer, a tablet, a mobile terminal, a server or the like. The information processing device 11 is a device owned by a service provider that provides a service to a user of the printer 10, or a device that the service provider is authorized to use. The service provider provides a service to the user of the printer 10 by using the information processing device 11. For example, the service provider uses the information processing device 11 to monitor the remaining amounts of consumables such as inks or toners stored in respective cartridges 13 which will be described later, attached to the printer 10. Then, before a consumable runs out, the service provider ships a new cartridge 13 to the user or arranges the shipment. The user replaces an old cartridge 13 in which the consumable is used up with the delivered new cartridge 13.

Hereinafter, the information processing device 11 and the printer 10 will be described in detail. In the following, an example in which the information processing device 11 is a personal computer will be described.

The information processing device 11 includes a controller 61, a display 62, a user I/F 63, and a communication I/F 64. "I/F" stands for interface. The user I/F 63 is a mouse, a keyboard, or the like.

The controller 61 mainly includes a CPU 65, a memory 66, and a not-shown communication bus. The CPU 65, the memory 66, the display 62, the user I/F 63, and the communication I/F 64 are connected to the communication bus. That is, the CPU 65 is connected to the memory 66, the display 62, the user I/F 63, and the communication I/F 64 via the communication bus so as to be able to exchange information and data with each other.

The memory 66 is a ROM, a RAM, a hard disk, or the like. The memory 66 stores an Operating System (OS), a device program, and a mailer. Instructions described in the OS, the device program and the mailer are executed by the CPU 65. That is, the OS, the device program and the mailer are executed by the CPU 65. The OS, the device program and the mailer executed by the CPU 65 cause the display 62 to display images, receive user inputs through the user I/F 63, transmit and receive information and data through the communication I/F 64, and store the received information and data in the memory 66.

The printer 10 may be a dedicated printer used only in a mode in which the user makes a contract with the service provider to use the printer 10, or may be a general-purpose printer that can be used regardless of whether or not the contract between the user and the service provider is made. Hereinafter, an example in which the printer 10 is a general-purpose printer will be described. In the following description, a mode in which a user makes a contract with a service provider to use the printer 10 will be referred to as a contract usage mode, and a mode in which a user does not make a contract with a service provider to use the printer 10 will be referred to as a normal usage mode.

Figure 2A:
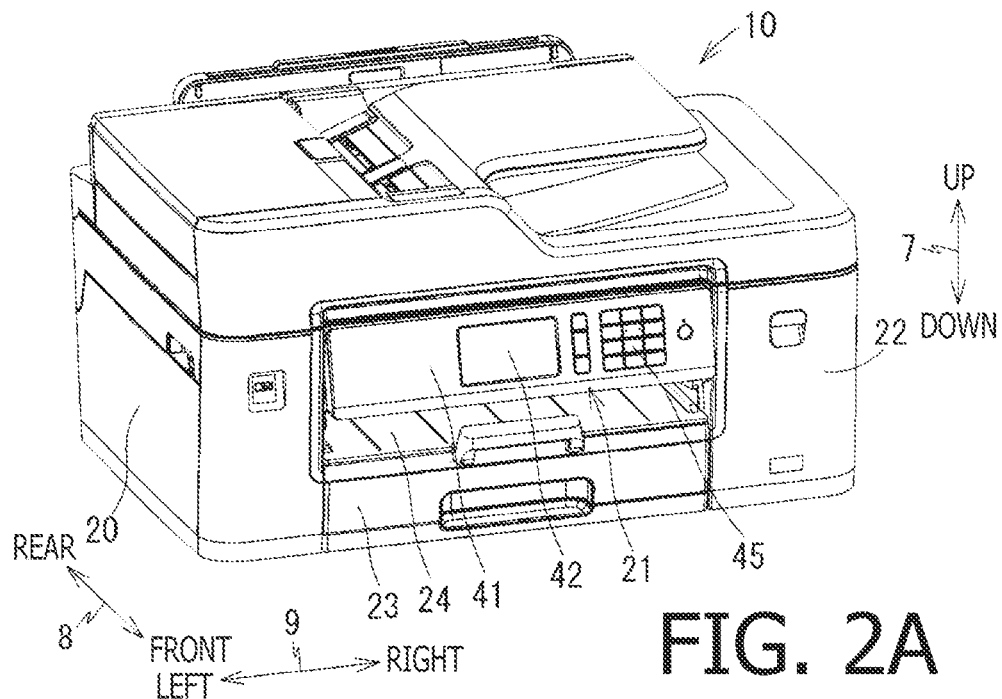
FIG. 2A is a perspective view of the printer with a cover closed.
Figure 2B:
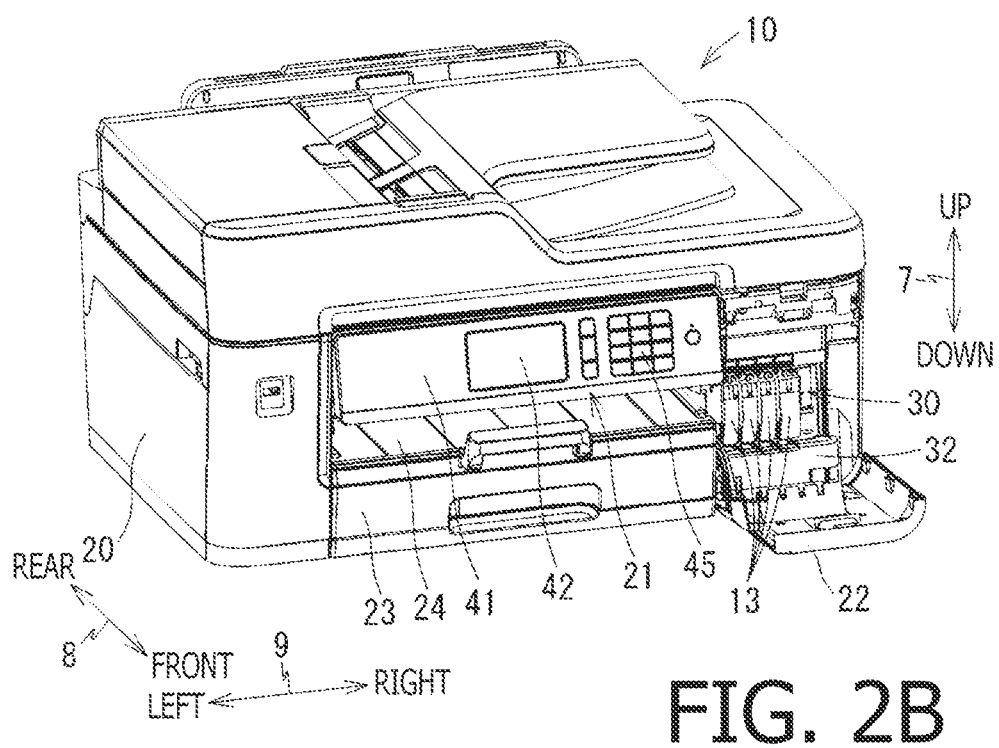
FIG. 2B is a perspective view of the printer with the cover opened.

As shown in FIG. 2, the printer 10 includes a housing 20, and a panel assembly 21, a cover 22, a sheet feed tray 23 and a sheet discharge tray 24 that are held by the housing 20.

The panel assembly 21 includes a panel body 41, a display 42 and a plurality of operation switches 45 held by the panel body 41. The panel body 41 has a rectangular plate shape and is attached to one surface of the housing 20. In the following description, in a state in which the printer 10 is placed on a horizontal surface, a front-rear direction 8 is defined with one surface of the housing 20 on which the panel body 41 is placed as a front surface, and a direction along a vertical direction is defined as an up-down direction 7. Further, the left and right when the printer 10 is viewed from the front are defined as a left-right direction 9. The front-rear direction 8 and the left-right direction 9 are parallel to the horizontal surface, are orthogonal to the up-down direction 7, and are orthogonal to each other.

The display 42 displays an image. As shown in FIG. 1, the display 42 includes a touchscreen function, and has a transparent film-shaped touch sensor 44 that is superimposed on the display 42. The touch sensor 44 outputs position information indicating a position on the display 42 touched by the user. The position information is, for example, coordinates (x, y) on the x-y plane when an upper left end of the display 42 is set as the origin, a right direction is set as the positive direction of the x axis, and a downward direction is set as the positive direction of the y axis.

The display 42 and the touch sensor 44 are connected to a controller 51 (FIG. 1) described later by a cable or the like. The controller 51 outputs image data to the display 42 to cause the display 42 to display an image. The controller 51 also receives the position information output from the touch sensor 44. The controller 51 determines an object such as an icon displayed at a position indicated by the position information input from the touch sensor 44 as an object selected by the user.

The operation switch 45 has a contact that opens and closes in accordance with a user operation. The operation switch 45 outputs different voltage values in the case the contact is open and in the case the contact is closed. The operation switch 45 is connected to the controller 51 by a cable or the like. The controller 51 determines whether or not the operation switch 45 is operated by the user based on a voltage value input from the operation switch 45. It is noted that only either of the touch sensor 44 and the operation switches 45 may be provided to the panel assembly 21.

As shown in FIG. 2, the sheet feed tray 23 is located at a lower portion of the housing 20 and is detachably held by the housing 20. The sheet discharge tray 24 is located at a lower portion of the housing 20 and above the sheet feed tray 23, and is held by the sheet feed tray 23 or the housing 20. The cover 22 is positioned at the right portion of the front surface of the housing 20 and is rotatably held by the housing 20. The cover 22 rotates between a closed position at which the cover 22 closes an opening 30 provided at the right portion of the housing 20 and an open position at which the cover 22 opens the opening 30. A mounting case 32 is disposed behind the opening 30 and held by the housing 20. The mounting case 32 has a configuration of detachably holding the cartridges 13. Since this configuration is well known, detailed description thereof will be omitted.

The mounting case 32 detachably holds the plurality of cartridges 13. In the illustrated example, the mounting case 32 detachably holds four cartridges 13. Each of the four cartridges 13 stores, for example, ink of one of magenta, cyan, yellow, and black colors. That is, the printer 10 is a so-called inkjet printer and is a so-called color printer. However, the mounting case 32 may detachably hold only one cartridge 13 storing ink of black color. That is, the printer 10 may be a so-called monochrome printer. The mounting case 32 may detachably hold one or a plurality of cartridges 13 containing toner instead of ink. That is, the printer 10 may be a so-called laser printer.

Figure 3:
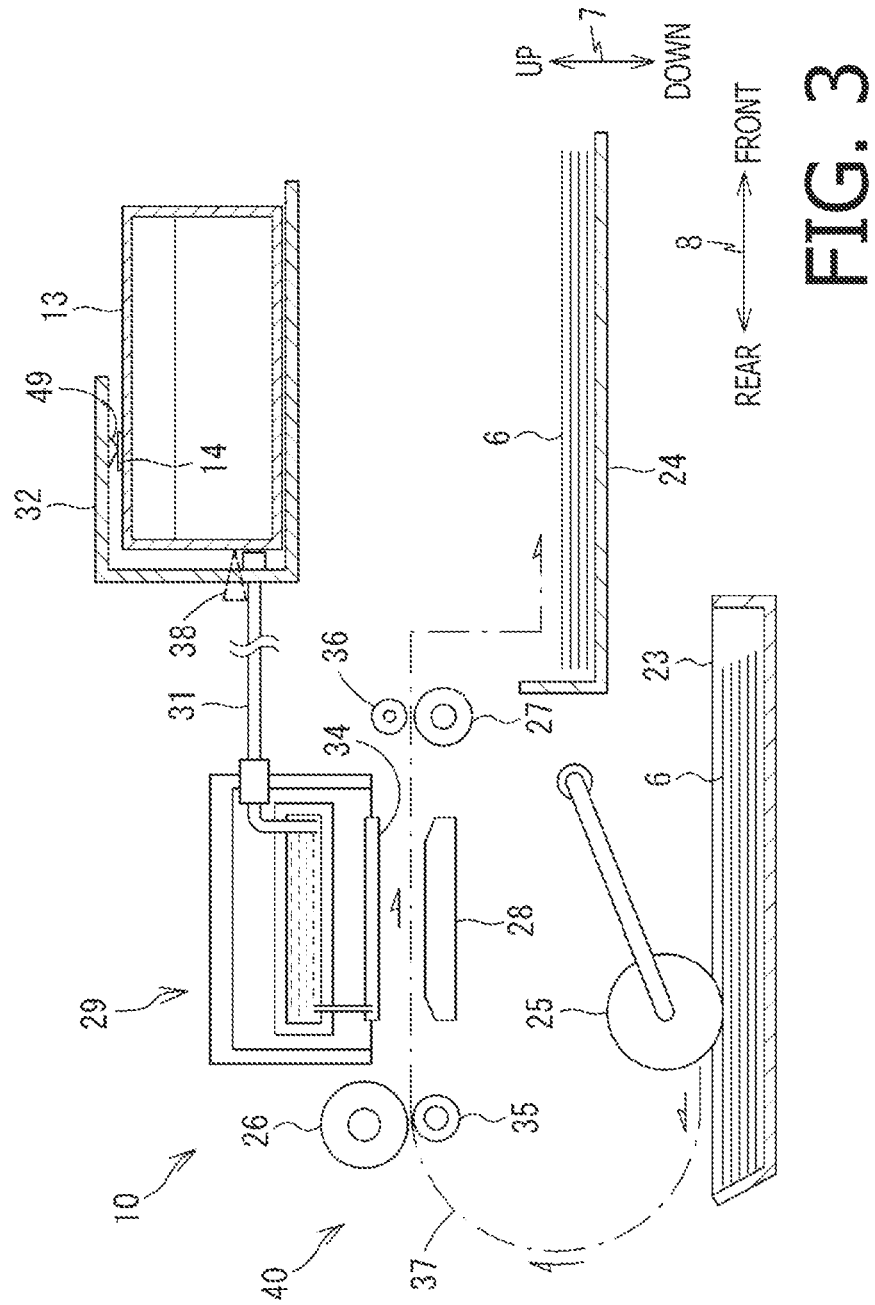
FIG. 3 is a schematic cross-sectional view of the printer.

The mounting case 32 has a cartridge I/F 49 shown in FIG. 3. The cartridge I/F 49 is, for example, terminals. The cartridge I/F 49 is provided at a position where it contacts not-shown electrodes of IC chips 14 which the cartridges 13 mounted in the mounting case 32 have. The cartridge I/F 49 is connected to the controller 51 described later by a not-shown cable.

It is noted that the cartridge I/F 49 may be an antenna. For example, as the cartridge OF 49, a substrate having a pattern antenna is provided to the mounting case 32. Similarly, the IC chip 14 is provided with an antenna. The cartridge I/F 49 outputs radio waves to be received by the antenna of the IC chip 14 and the antenna of the IC chip 14 receives the output radio waves. That is, the cartridge I/F 49 receives information or data from the IC chip 14 and transmits information or data to the IC chip 14 by way of radio waves.

The cartridge I/F 49 may also be a light emitting diode and a photodiode. For example, as the cartridge I/F 49, a substrate having a light emitting diode and a photodiode is provided to the mounting case 32. Similarly, the IC chip 14 is provided with a light emitting diode and a photodiode. The cartridge I/F 49 emits light to be received by the photodiode of the IC chip 14 and receives light emitted by the light-emitting diode of the IC chip 14. That is, the cartridge I/F 49 may receive information or data from the IC chip 14 and transmit information or data to the IC chip 14 by way of light.

A liquid level sensor 38 is provided to the mounting case 32. The liquid level sensor 38 is, for example, a photointerrupter having a light emitting diode and a photodiode. The liquid level sensor 38 is provided such that the cartridge 13 mounted in the mounting case 32 is positioned on an optical path between the light emitting diode and the photodiode. The cartridge 13 has a light-transmitting property at a portion positioned on the optical path. For example, the cartridge 13 is manufactured by using a resin molded product having translucency to at least a part of the cartridge 13.

The liquid level sensor 38 is positioned such that the above-described optical path is between an upper end and a lower end of the cartridge 13 in the up-down direction 7. In the illustrated example, the optical path of the liquid level sensor 38 is positioned below an intermediate position between an upper end and a lower end of the cartridge 13 in the up-down direction 7. The liquid level sensor 38 outputs a first detection signal when there is ink on the optical path, and outputs a second detection signal different from the first detection signal when there is no ink on the optical path. That is, the first detection signal indicates that the cartridge 13 has a certain amount of ink, and the second detection signal indicates that the cartridge 13 does not have the certain amount of ink due to consumption of ink therein. In the following description, the position of the optical path of the liquid level sensor 38 is referred to as a "detection position."

The liquid level sensor 38 is connected to the controller 51 using a not-shown cable or the like. That is, the first detection signal and the second detection signal output from the liquid level sensor 38 are input to the controller 51. The controller 51 determines whether or not a liquid level of the ink stored in the cartridge 13 mounted in the mounting case 32 has fallen to the detection position based on whether the signal input from the liquid level sensor 38 is the first detection signal or the second detection signal. Details will be described later.

The cartridge 13 has a box shape having an internal space for storing ink. Since the basic configuration of the cartridge 13 is well known, detailed description thereof will be omitted. The cartridge 13 includes the IC chip 14. In the illustrated example, the IC chip 14 is attached to an upper surface of the cartridge 13. The IC chip 14 has a not-shown electrode that contacts the cartridge I/F 49, which is a terminal, and an IC memory 15 electrically connected to the electrode. Alternatively, the IC chip 14 has an antenna such as a pattern antenna, or a light emitting diode and a photodiode in place of the electrode. The IC memory 15 stores various information. Specifically, the IC memory 15 stores at least a model number, type information, an initial storing amount value, a serial number, and a transmission address.

The model number is identification information assigned to the cartridge 13 in accordance with the color of ink stored in the cartridge 13 and the type of ink such as dye or pigment. The type information is information indicating whether the cartridge 13 is a cartridge to be used in the contract usage mode or a cartridge to be used in the normal usage mode. For example, the type information is 1-bit data that is stored at a predetermined address of the IC memory 15 and that indicates "0" or "1." For example, "1" indicates that the cartridge is to be used in the contract usage mode, and "0" indicates that the cartridge is used in the normal usage mode. However, the type information may be included in the model number. That is, one model number may indicate the color and type of one ink and whether the ink is to be used in the normal usage mode or the contract usage mode. In a case where the printer 10 is a dedicated printer to be used only in a mode in which the user makes a contract with the service provider to use the printer 10, the type information is not stored in the IC memory 15.

The initial storing amount value indicates an initial amount of ink stored in the cartridge 13. The initial storing amount value is used for calculation of the remaining amount of ink in the cartridge 13 and the like by the controller 51. The serial number is a number for identifying each cartridge 13. The serial number is used by the controller 51 to determine whether or not the cartridge 13 has been replaced. For example, in response to the serial number obtained from the IC memory 15 not matching the serial number stored in the memory 53 described later, the controller 51 described later determines that the cartridge 13 has been replaced. Details will be described later.

The transmission address is an e-mail address of the information processing device 11. The transmission address is used when the controller 51 transmits an e-mail to the information processing device 11.

The model number, the type information, the initial storage amount value, and the serial number described above are information stored in advance in the IC memory 15 by a manufacturer of the cartridge 13. The transmission address is information stored in the IC memory 15 by the service provider.

The housing 20 holds a print engine 40 therein. The print engine 40 mainly includes a sheet feed roller 25, a conveying roller 26, a discharge roller 27, a platen 28, and a recorder 29. The sheet feed roller 25 is held by a not-shown frame provided in the housing 20 so as to be able to contact a sheet 6 placed on the sheet feed tray 23. The sheet feed roller 25 is rotated by a not-shown motor. The rotating sheet feed roller 25 feeds the sheet 6 to a conveyance path 37. The conveyance path 37 is a space defined by a not-shown guide member. In the illustrated example, the conveyance path 37 extends in a curved manner from a rear end of the sheet feed tray 23 to a position above the sheet feed tray 23, and then extends forward.

The conveying roller 26 is located downstream of the sheet feed tray 23 in a conveying direction of the sheet 6. The conveying roller 26 and a driven roller 35 constitute a roller pair. The conveying roller 26 is rotated by a not-shown motor. The rotating conveying roller 26 and driven roller 35 convey the sheet 6 fed to the conveyance path 37 by the sheet feed roller 25 while nipping the sheet 6. The discharge roller 27 is located downstream of the conveying roller 26 in the conveying direction of the sheet 6. The discharge roller 27 and a driven roller 36 constitute a roller pair. The discharge roller 27 is rotated by a not-shown motor. The rotating discharge roller 27 and driven roller 36 convey the sheet 6 while nipping the sheet 6, and discharge the sheet 6 on the sheet discharge tray 24. The platen 28 is located between the conveying roller 26 and the discharge roller 27 in the front-rear direction 8, and downstream of the conveying roller 26 and upstream of the discharge roller 27 in the conveying direction of the sheet 6.

The recorder 29 is located above the platen 28. The recorder 29 may be held by a guide rail that is a part of the frame so as to be movable in the left-right direction 9, or may be fixed to the frame. That is, the printer may be a so-called serial printer or a so-called line printer. The recorder 29 has a head 34. The head 34 has a flow path therein through which ink flows. The flow path communicates with the internal space of the cartridge 13 mounted in the mounting case 32 via a tube 31. That is, the ink stored in the cartridge 13 is supplied to the head 34 through the tube 31.

As shown in FIG. 1, the head 34 has a drive element 50. A portion of the drive element 50 constitutes a flow path inside the head 34. The drive element 50 is electrically connected to the controller 51 by a not-shown cable or the like. The drive element 50 is a piezoelectric element or a heater. The drive element 50 being a piezoelectric element deforms by being supplied with a direct current voltage, applies pressure to ink in the flow path, and causes ink droplets to be ejected from a nozzle being an opening of the flow path. The drive element 50 being a heater generates heat by being supplied with a direct current voltage, causes ink in the flow path to bump, and causes ink droplets to be ejected from the nozzle.

A number of ink droplets ejected from the nozzle can be specified from a number of times of supply of the direct current voltage or a direct current to the drive element 50. That is, the controller 51 calculates a count value of the number of ejected ink droplets by counting the number of times of the supply. The count value is used for calculation of the remaining amount of ink and the like. Details will be described later.

As shown in FIG. 1, the printer 10 further includes a scanner 46. The scanner 46 includes, for example, a contact glass and a scanning device having a reading sensor. The scanning device scans a sheet placed on the contact glass, and the reading sensor reads an image printed on the sheet to generate and output image data. The reading sensor and the scanning device are connected to the controller 51 described later by a cable or the like. The image data output from the scanning device is input to the controller 51. The scanner 46 may include a conveying device that conveys a sheet. That is, the scanner 46 may have a so-called auto document feeder (ADF) function.

The printer 10 further includes the controller 51, a clock module 48 and a communication I/F 47 shown in FIG. 1. The clock module 48 is, for example, an IC that outputs date and time information indicating the date and time.

The controller 51 has a CPU 52, a memory 53, and a communication bus 54. The CPU 52, the memory 53, the display 42, the operation switch 45, the communication I/F 47, and the cartridge I/F 49 are connected to the communication bus 54. That is, the CPU 52 is connected to the memory 53, the display 42, the operation switches 45, the communication I/F 47 and the cartridge I/F 49 via the communication bus 54 so as to be able to exchange information and data with each other.

The memory 53 has a ROM 55, a RAM 56, and an EEPROM 57. The ROM 55 stores an OS 58 and a control program 59 in advance. Instructions described in the OS 58 and the control program 59 are executed by the CPU 52. That is, the OS 58 and the control program 59 are executed by the CPU 52. The OS 58 and the control program 59 executed by the CPU 52 cause the display 42 to display an image and receive an input from the user through the touch sensor 44 and/or the operation switches 45. The OS 58 and the control program 59 executed by the CPU 52 transmit and receive information and data through the communication I/F 47 and the cartridge I/F 49, and store the received information and data in the memory 53.

The control program 59 may be a single program or a program including a plurality of modules. The control program 59 has, for example, a User Interface (UI) module, a communication module, and a print control module. Every module is executed in quasi parallel manner by a so-called multitasking.

The UI module is a program that inputs image data to the display 42, causes the display 42 to display an image including objects such as icons, and receives a signal output from the touch sensor 44 and/or the operation switches 45.

The communication module is a program for transmitting and receiving information and data in accordance with a communication protocol of a communication line to which the communication I/F 47 is connected. For example, in a case where the communication I/F 47 is connected to the USB cable, the communication module transmits and receives information and date using a communication protocol. In a case where the communication I/F 47 is connected to a LAN cable, or in a case where the communication I/F 47 is connected via a wireless local area network (LAN), the communication module transmits and receives information and data using a communication protocol such as TCP/IP.

The print control module is a program that generates and outputs drive signals to be input to drive circuits of the above-mentioned motors and a drive circuit of the drive element 50 based on print data.

The ROM 55 also stores pieces of image data indicating various screens described later. Details will be described later. The RAM 56 is used to execute the OS 58 and control program 59, and temporarily stores information and data in the execution of the OS 58 and control program 59. The EEPROM 57 stores a first threshold value and a second threshold value in advance, and stores a later-described user ID obtained by the controller 51 through the IC memory 15, the touch sensor 44, the operation switches 45, the communication I/F 47 or the like. Details will be described later. It is noted that the first threshold value and the second threshold value may be stored in the ROM 55.

The EEPROM 57 includes a first storage area 57A that stores the transmission address the controller 51 obtained from the IC memory 15 and a second storage area 57B that stores a destination address input through the touch sensor 44 and/or the operation switches 45. Details will be described later.

Hereinafter, processes executed by the control program 59 will be described with reference to FIGS. 4 to 8. It is noted that, in the following description, processes executed by the control program 59 will be described as processes executed by the controller 51 (particularly, the CPU 52).

The service provider has a printer having the same specifications as the printer 10 used by the user who has made a contract with the service provider. The service provider uses the printer having the same specifications as the printer 10 to store the transmission address in the cartridge 13. In the following description, the printer 10 used by the user who has made a contract with the service provider is referred to as a printer 10A, and the printer 10 used by the service provider to store the transmission address in the IC memory 15 of the cartridge 13 is referred to as a printer 10B. When the printer 10A used by the user who has made a contract with the service provider and the printer 10B used by the service provider are not distinguished from each other, they are referred to as the printer 10.

Figure 4:
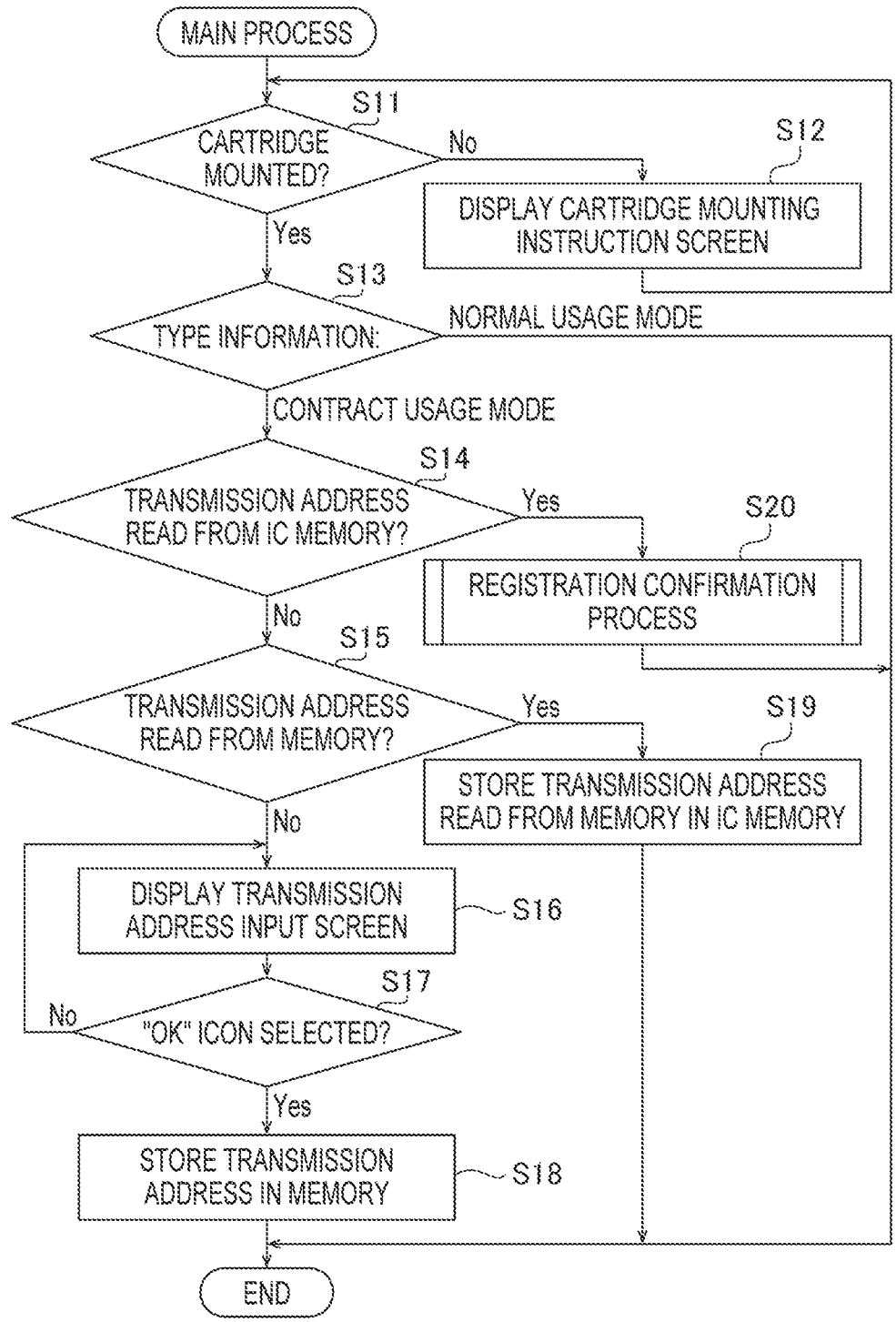
FIG. 4 is a flowchart of the main process.

The controller 51 of the printer 10 executes a main process illustrated in FIG. 4. For example, the controller 51 executes the main process every particular period. The main process is a process in which the controller 51 stores the transmission address stored in the IC memory 15 in the memory 53 or stores the transmission address stored in the memory 53 in the IC memory 15. This will be described in detail below.

First, the controller 51 executes a process corresponding to a determination on whether or not the cartridge 13 is mounted in the mounting case 32 (S11). Specifically, the controller 51 determines whether or not communication with the IC chip 14 is possible through the cartridge I/F 49. The controller 51 determines that the cartridge 13 is mounted in the mounting case 32 based on the fact that the controller 51 can communicate with the IC chip 14 through the cartridge I/F 49 (S11: Yes). The controller 51 determines that the cartridge 13 is not mounted in the mounting case 32 based on the fact that the controller 51 cannot communicate with the IC chip 14 through the cartridge I/F 49 (S11: No).

It is noted that the controller 51 may execute a process other than the above-described process as long as the process corresponds to the determination on whether or not the cartridge 13 is mounted in the mounting case 32. For example, a mounting sensor may be provided to the mounting case 32. The mounting sensor is a photointerrupter provided such that the cartridge 13 mounted in the mounting case 32 is positioned on the optical path. The mounting sensor outputs a first detection signal when the cartridge 13 is mounted in the mounting case 32. On the other hand, when the cartridge 13 is not mounted in the mounting case 32, the mounting sensor outputs a second detection signal different from the first detection signal. The controller 51 determines whether the first detection signal or the second detection signal is input from the mounting sensor (S11). In response to the input of the first detection signal from the mounting sensor, the controller 51 determines that the cartridge 13 is mounted in the mounting case 32 (S11: Yes). In response to the input of the second detection signal from the mounting sensor, the controller 51 determines that the cartridge 13 is not mounted in the mounting case 32 (S11: No).

The controller 51 executes the determination of step S11 for all the cartridges 13 that are mounted in the mounting case 32. When it is determined that at least one cartridge 13 is not mounted in the mounting case 32 (S11: No), the controller 51 causes the display 42 to display a cartridge mounting instruction screen (S12). Specifically, the controller 51 reads image data indicating the cartridge mounting instruction screen which is stored in advance in the ROM 55 of the memory 53, and outputs the image data to the display 42. The cartridge mounting instruction screen is, for example, a screen including characters indicating opening of the cover 22 and mounting of the cartridge 13 to the mounting case 32.

The controller 51 causes the display 42 to display the cartridge mounting instruction screen until it is determined that all the cartridges 13 are mounted in the mounting case 32. When it is determined that all the cartridges 13 are mounted in the mounting case 32 (S11: Yes), the controller 51 obtains the type information described above from the IC memory 15 through the cartridge I/F 49. Then, the controller 51 determines whether the obtained type information indicates the normal usage mode or the contract usage mode (S13).

When it is determined that the obtained type information indicates the normal usage mode (S13: normal usage mode), the controller 51 ends the main process. That is, the processes after step S14 are executed when the cartridge 13 for the contract usage mode is mounted to the mounting case 32. Although not illustrated in the flowchart, the controller 51 may end the main process when it is determined that at least one of all the pieces of type information obtained from all the cartridges 13 mounted in the mounting case 32 indicates the normal usage mode. In this case, when it is determined that all the pieces of type information obtained from all the cartridges 13 mounted in the mounting case 32 indicate the contract usage mode (S13: contract usage mode), the controller 51 executes the processes on and after the step S14. Alternatively, when it is determined that all the pieces of type information obtained from all the cartridges 13 mounted in the mounting case 32 indicate the normal usage mode, the controller 51 may end the main process. In this case, when it is determined that at least one of all the pieces of type information obtained from all the cartridges 13 mounted in the mounting case 32 indicates the contract usage mode (S13: contract usage mode), the controller 51 executes the processes on and after step S14.

When it is determined that the obtained type information indicates the contract usage mode (S13: contract usage mode), the controller 51 determines whether or not the transmission address has been read from the IC memory 15 (S14). When the cartridge 13 mounted in the mounting case 32 stores the transmission address in the IC memory 15, the controller 51 can read the transmission address from the IC memory 15. When the cartridge 13 mounted in the mounting case 32 is the cartridge 13 in which the transmission address is not stored in the IC memory 15, the controller 51 cannot read the transmission address from the IC memory 15.

When the transmission addresses cannot be read from the IC memories 15 of all the cartridges 13 mounted in the mounting case 32, the controller 51 determines that the transmission address cannot be read from the IC memory 15 (S14: No). Alternatively, the controller 51 may determine that the transmission address cannot be read from the IC memory 15 when the transmission address cannot be read from the IC memory 15 of a specific cartridge 13 mounted in the mounting case 32 (S14: No). The specific cartridge 13 is, for example, the cartridge 13 that stores black ink.

When it is determined that the transmission address cannot be read from the IC memory 15 (S14: No), the controller 51 determines whether the transmission address has been read from the memory 53 (S15). When the transmission address is stored in the memory 53, the controller 51 can read the transmission address from the memory 53. When the transmission address is not stored in the memory 53, the controller 51 cannot read the transmission address from the memory 53.

When it is determined that the transmission address cannot be read from the memory 53 (S15: No), the controller 51 causes the display 42 to display a transmission address input screen (S16). Specifically, the controller 51 reads image data indicating the transmission address input screen from the ROM 55 of the memory 53 and outputs the image data to the display 42. The transmission address input screen includes, for example, characters "please input a transmission address," a text box displaying the input transmission address, an "OK" icon, and a "cancel" icon. For example, when the cartridge 13 for the contract usage mode is mounted to the mounting case 32 of the printer 10 which is in the printer 10B owned by the service provider and to which the transmission address has not been input yet, the transmission address input screen is displayed on the display 42.

The controller 51 determines whether or not the transmission address is input and the "OK" icon is selected on the transmission address input screen (S17). Specifically, the controller 51 determines whether or not position information on the display 42 at which the "OK" icon is displayed is input from the touch sensor 44. When the position information is input from the touch sensor 44, the controller 51 determines that the "OK" icon has been selected. In the following description, the input of the position information indicating the icon to the controller 51 will be simply referred to as "the icon has been selected."

The controller 51 causes the display 42 to display the transmission address input screen until it is determined that the transmission address has been input and the "OK" icon has been selected or that the "cancel" icon has been selected on the transmission address input screen (S17: No). When it is determined that the transmission address has been input and the "OK" icon has been selected on the transmission address input screen (S17: Yes), the controller 51 stores the input transmission address in the first storage area 57A of the EEPROM 57 of the memory 53 (S18). That is, when the transmission address is neither stored in the IC memory 15 nor the memory 53, the controller 51 prompts the service provider to input the transmission address, and stores the input transmission address in the memory 53. Although not illustrated in the flowchart, when it is determined that the "cancel" icon has been selected on the transmission address input screen, the controller 51 ends the main process.

When it is determined that the transmission address has been read from the memory 53 (S15: Yes), the controller 51 stores the transmission address read from the memory 53 in the IC memory 15 of the IC chip 14 through the cartridge I/F 49 (S19), and ends the main process. That is, when the transmission address is not stored in the IC memory 15 but is stored in the memory 53, the controller 51 stores the transmission address stored in the memory 53 in the IC memory 15. For example, the service provider inputs the transmission address to the printer 10B owned by the service provider to store the transmission address in the memory 53, and then mounts the cartridge 13 in which the transmission address is not stored in the IC memory 15 in the mounting case 32 of the printer 10B. Then, the controller 51 of the printer 10B stores the transmission address stored in the memory 53 in the IC memory 15 of the cartridge 13 mounted in the mounting case 32. That is, the service provider can store the transmission address in the IC memory 15 by using the printer 10B owned by the service provider.

When it is determined that the transmission address has been read from the IC memory 15 through the cartridge I/F 49 (S14: Yes), the controller 51 executes a registration confirmation process (S20). The registration confirmation process will be described with reference to FIG. 5A.

First, the controller 51 determines whether or not the transmission address has been read from the memory 53 of the EEPROM 57 in the same manner as in step S15 (S21). That is, the controller 51 determines whether or not the transmission address has been read from the memory 53 of the EEPROM 57 by determining whether the transmission address is stored in the memory 53. When it is determined that the transmission address has not been read from the EEPROM 57 (S21: No), the controller 51 stores the transmission address read from the IC memory 15 in the first storage area 57A of the EEPROM 57 in the memory 53 (S22). That is, in a case where the transmission address is stored in the IC memory 15 but is not stored in the memory 53, the controller 51 stores the transmission address stored in the IC memory 15 in the memory 53. For example, when the cartridge 13 in which transmission address is stored in the IC memory 15 is mounted to the mounting case 32 of the printer 10A, the controller 51 of the printer 10A stores the transmission address stored in the IC memory 15 in the first storage area 57A of the EEPROM 57. Then, the controller 51 ends the main process. Although not illustrated in the flowchart, in step S22, the controller 51 may store the model number, the type information, the initial storage amount value and the serial number stored in the IC memory 15 in the EEPROM 57 of the memory 53 together with the transmission address.

When it is determined that the transmission address has been read from the EEPROM 57 of the memory 53 (S21: Yes), the controller 51 determines whether or not the transmission address read from the EEPROM 57 matches the transmission address read from the IC memory 15 (S23). When it is determined that the transmission address read from the EEPROM 57 matches the transmission address read from the IC memory 15 (S23: Yes), the controller 51 ends the main process.

When it is determined that the transmission address read from the EEPROM 57 does not match the transmission address read from the IC memory 15 (S23: No), the controller 51 executes an output process (S24). Specifically, the controller 51 outputs the transmission address read from the IC memory 15 to the display 42. Alternatively, the controller 51 outputs the transmission address read from the IC memory 15 to the print engine 40 to print on the sheet 6. Alternatively, the controller 51 outputs the transmission address read from the IC memory 15 to a conventionally-known personal computer to display the transmission address on a display of the personal computer.

For example, in a case where the transmission address of the service provider has been changed, the service provider sends the cartridge 13 storing the changed transmission address in the IC memory 15 to the user. When the cartridge 13 storing the changed transmission address in the IC memory 15 is mounted to the mounting case 32, the changed transmission address is printed on the sheet 6 or displayed on the display 42. That is, the user can recognize that the e-mail address of the service provider has been changed and the changed e-mail address.

Figure 6A:
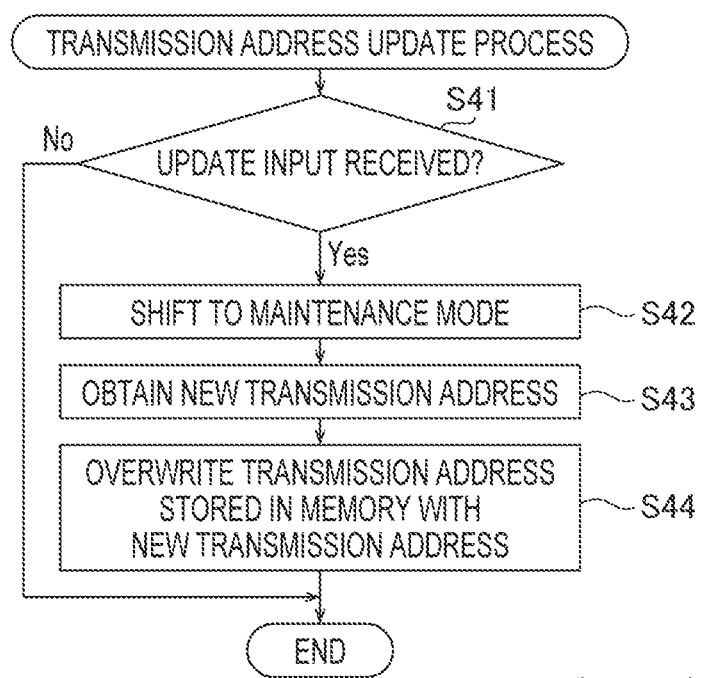
FIG. 6A is a flowchart of the transmission address update process.
Figure 6B:
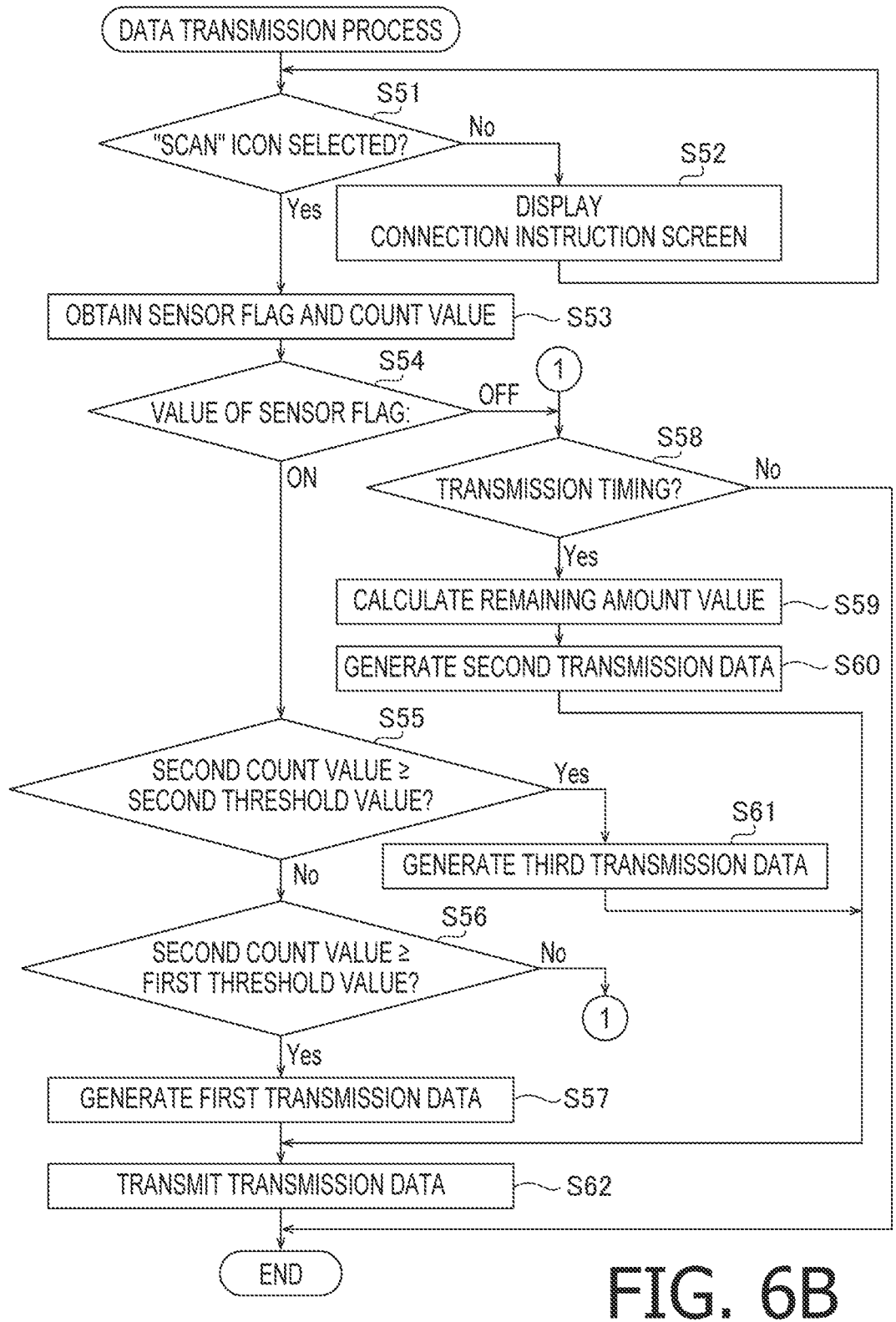
FIG. 6B is a flowchart of data transmission processing.

Next, a data transmission process in which the controller 51 transmits an e-mail including transmission data to the transmission address will be described with reference to FIG. 6B. For example, the controller 51 executes the data transmission process for each cartridge 13 mounted in the mounting case 32.

First, a process in which the controller 51 obtains a user ID to be included in the transmission data and stores the user ID in the EEPROM 57 of the memory 53 will be described. The user ID is information for identifying the user and the printer 10. When the user ID is stored in the IC memory 15, the controller 51 obtains the user ID from the IC memory 15 through the cartridge I/F 49. Alternatively, the controller 51 obtains the user ID input to the printer 10 by an operator who installs the printer 10 or the user using the touch sensor 44 and/or the operation switches 45. Alternatively, the controller 51 obtains the user ID input from a personal computer, a tablet, or a portable terminal through the communication I/F 47. Alternatively, the controller 51 obtains a MAC address and/or a serial number stored in advance in the EEPROM 57 of the memory 53 as the user ID. The controller 51 stores the obtained user ID in a preset storage area in the EEPROM 57 as transmission source information to be included in the transmission data to be transmitted to the information processing device 11.

For example, the controller 51 executes the data transmission process in response to causing the ink to flow out from the head 34 by executing printing or maintenance and in response to coming of a transmission timing. The maintenance is, for example, a process of sucking ink from the nozzles of the head 34 by a conventionally-known pump or a process of ejecting ink from the nozzles by driving the drive element 50. That is, when the amount of ink stored in the cartridge 13 changes and the transmission timing comes, the data transmission process is executed.

The transmission timing is, for example, a fixed time or every particular time. The transmission timing is information input to the printer 10 by the operator, the user, or the service provider using the information processing device 11, a personal computer, a tablet, or a portable terminal. The controller 51 stores the transmission timing input through the touch sensor 44, the operation switch 45, and/or the communication I/F 47 in the EEPROM 57. In response to date and time indicated by date and time information output by the clock module 48 becoming date and time indicated by the transmission timing, the controller 51 determines that the transmission timing has come.

First, the controller 51 executes a process corresponding to a determination on whether or not the communication I/F 47 is connected to a local network such as a LAN or a personal computer (S51). For example, the controller 51 outputs a PING command through the communication I/F 47. Then, the controller 51 determines that the communication I/F 47 is connected to the local network or the personal computer in response to receiving an ACK signal. The controller 51 determines that the communication I/F 47 is not connected to the local network or the personal computer in response to not receiving the ACK signal even if retry is executed a particular number of times.

When it is determined that the communication I/F 47 is not connected to the local network or the personal computer (S51: No), the controller 51 causes the display 42 to display a connection instruction screen (S52). Specifically, the controller 51 reads image data indicating the connection instruction screen from the ROM 55, and inputs the read image data to the display 42.

The connection instruction screen includes characters "IT IS NOT CONNECTED TO THE INTERNET." and characters "IF IT IS NOT CONNECTED TO THE INTERNET, YOU CANNOT RECEIVE THE SERVICE. PLEASE CONNECT TO THE INTERNET." The connection instruction screen further includes an "OK" icon and a "DETAIL" icon.

Although not illustrated in the flowchart, in response to the selection of the "DETAIL" icon, the controller 51 for example causes the display 42 to display a screen displaying detailed information for connecting to the Internet Image data indicating this screen is stored in the ROM 55 in advance. Then, in response to the selection of the "OK" icon on the connection instruction screen, the controller 51 executes the process of step S51 again.

When it is determined in step S51 that the communication I/F 47 is connected to the local network or the personal computer (S51: Yes), the controller 51 obtains a value of a sensor flag and the count value that are stored in EEPROM 57 (S53). The count value is a value that is counted by the controller 51 by accumulating every time the controller 51 causes ink to flow out from the head 34. Specifically, when printing on a sheet is executed, the controller 51 calculates the number of ink droplet that have been ejected as the count value based on print data. Then, the controller 51 adds the new count value to the count value up to the previous printing and stores the result in the EEPROM 57.

When the pump sucks ink from the nozzles of the head 34 in the above-mentioned maintenance, the controller 51 may convert an amount of ink sucked from the head 34 by the pump into, for example, a number of times of ejection of an ink droplet having a particular amount and add the number to the count value. Beside the execution of printing, the controller 51 may calculate the count value and accumulate the count value in a case where the drive element 50 is driven to eject the ink droplets from the nozzles. That is, the controller 51 counts an amount of ink flowing out from the head 34 as the number of times of ejection of the ink droplets. The count value counted by the controller 51 indicates a total number of ink droplets flowing out from the head 34. That is, the count value indicates an amount of ink that flowed out from the head 34, in other words, an amount of ink consumed in the printer 10. It is noted that the count value is counted for every cartridge 13 mounted in the mounting case 32. The count value is reset when the cartridge 13 is replaced.

The sensor flag is a flag indicating whether the liquid level of ink stored in the cartridge 13 mounted in the mounting case 32 is equal to or higher than the detection position or lower than the detection position. The sensor flag is set either of "ON" or "OFF". The flag of "ON" indicates that the liquid level of ink is lower than the detection position, i.e., the cartridge 13 does not have the certain amount of ink. The flag of "OFF" indicates that the liquid level of ink is equal to or higher than the detection position, i.e., the cartridge 13 has a certain amount of ink. An initial value of the sensor flag is "OFF." In response to a change of the detection signal output from the liquid level sensor 38 from the first detection signal to the second detection signal, the controller 51 stores the sensor flag having the value of "ON" in the EEPROM 57. Then, in response to replacement of the cartridge mounted in the mounting case 32 to another cartridge 13, the controller 51 stores the sensor flag having the value of "OFF" in the EEPROM 57.

An example of the determination of replacement of the cartridge 13 will be described. When the cartridge 13 is mounted to the mounting case 32, the controller 51 obtains the serial number from the IC memory 15 through the cartridge I/F 49. Then, the controller 51 determines whether or not the serial number stored in the EEPROM 57 of the memory 53 matches the serial number obtained from the IC memory 15. In response to determining that the serial number stored in the EEPROM 57 of the memory 53 does not match the serial number obtained from the IC memory 15, the controller 51 determines that the cartridge 13 has been replaced. In response to determining that the cartridge 13 has been replaced, the controller 51 overwrites the serial number stored in the EEPROM 57 of the memory 53 with the serial number obtained from the IC memory 15.

In response to storing the sensor flag having the value of "ON" in the EEPROM 57, the controller 51 resets the count value and resumes the accumulation of the count value. That is, when the value of the sensor flag is "OFF", the count value obtained in step S53 indicates an amount of ink flowed out from the head 34 before the liquid surface of the ink stored in the cartridge 13 mounted in the mounting case 32 falls to the detection position. When the value of the sensor flag is "ON", the count value obtained in step S53 indicates an amount of ink flowed out from the head 34 after the liquid level of ink stored in the cartridge 13 mounted in the mounting case 32 reached fell to the detection position. In the following description, the count value when the value of the sensor flag is "OFF" is referred to as a first count value, and the count value when the value of the sensor flag is "ON" is referred to as a second count value.

The controller 51 determines whether the value of the sensor flag obtained in step S53 is "OFF" or "ON" (S54). In other words, in step S54, it is determined whether the count value obtained by the controller 51 in step S53 is the first count value or the second count value. When it is determined that the obtained value of the sensor flag is "ON" (S54: ON), the controller 51 determines whether or not the second count value, which is the count value obtained in step S53, is equal to or greater than the second threshold value (S55). The second threshold value is a value that is stored in advance in the EEPROM 57 as a value at which a problem may occur in the printer 10 if ink further flows out of the head 34. Although not illustrated in the flowchart, when it is determined that the second count value is equal to or greater than the second threshold value, the controller 51 prohibits the driving of the drive element 50 and the pump included in the maintenance mechanism described above so that failure does not occur in the printer 10. That is, the controller 51 prohibits the ink from flowing out of the head 34. Specifically, the controller 51 stores an empty flag having a value of "ON" in the EEPROM 57. The controller 51 determines whether the value of the empty flag is "ON" or "OFF" before driving the drive element 50 and the above-described pump. When the value of the empty flag is "OFF," the controller 51 drives the drive element 50 and the above-described pump. When the value of the empty flag is "ON," the controller 51 does not drive the drive element 50 and the pump described above.

When it is determined in step S55 that the second count value is equal to or greater than the second threshold value (S55: Yes), the controller 51 generates third transmission data (S61). Specifically, the controller 51 obtains the empty information indicating that the ink stored in the cartridge 13 has been used up from the ROM 55 or the EEPROM 57 and includes the empty information in the third transmission data. The empty information is information stored in advance in the ROM 55 or the EEPROM 57.

Further, the controller 51 obtains a model number of the cartridge 13 whose ink has been used up from the EEPROM 57, or obtains the model number of the cartridge 13 from the IC memory 15 through the cartridge I/F 49, and includes the obtained model number in the third transmission data. In addition, the controller 51 includes the above-described user ID stored in the EEPROM 57 in the third transmission data.

When it is determined that the obtained count value is not equal to or greater than the second threshold value (S55: No), the controller 51 determines whether the second count value is equal to or greater than the first threshold (S56). The first threshold value is smaller than the second threshold value.

When it is determined that the second count value is equal to or greater than the first threshold value (S56: Yes), the controller 51 generates first transmission data (S57). Specifically, the controller 51 obtains an order information indicating that arrangement of the cartridge 13 is necessary from the ROM 55 or the EEPROM 57 and includes the order information in the first transmission data. The order information is information stored in advance in the ROM 55 or the EEPROM 57.

Further, the controller 51 obtains the model number of the cartridge 13 that needs to be arranged from the EEPROM 57, or from the IC memory 15 through the cartridge I/F 49, and includes the model number in the first transmission data. The controller 51 also obtains the user ID from the EEPROM 57 and includes the user ID in the first transmission data.

When it is determined that the second count value is not equal to or greater than the first threshold value (S56: No) or when it is determined that the sensor flag is "OFF" (S54: OFF), the controller 51 determines whether or not the data transmission process has been executed in response to coming of the transmission timing (S58). When it is determined that the data transmission process has been executed in response to coming of the transmission timing (S58: Yes), the controller 51 calculates a remaining amount value (S59). Specifically, when it is determined that the value of the sensor flag is "OFF" (S54: OFF), the controller 51 obtains the initial storage amount value from the EEPROM 57 of the memory 53. The initial storage amount value is a value stored in the EEPROM 57 in step S22 together with the transmission address. The controller 51 calculates the remaining amount value by subtracting the first count value, which is the count value obtained in step S53, from the obtained initial storage amount value (S59). On the other hand, when it is determined that the second count value is not equal to or greater than the first threshold value (S56: No), the controller 51 obtains a fixed initial value from the ROM 55. The fixed initial value is a value indicating a remaining amount of ink stored in the cartridge 13 when the liquid surface of ink stored in the cartridge 13 mounted in the mounting case 32 is at the detection position, and is a value stored in advance in the ROM 55. The controller 51 calculates the remaining amount value by subtracting the second count value, which is the count value obtained in step S53, from the obtained fixed initial value (S59).

The controller 51 associates the calculated remaining amount value with the model number of the cartridge 13 and includes them in second transmission data (S60). The controller 51 further obtains the user ID from the EEPROM 57 and includes the user ID in the second transmission data (S60).

When it is determined that the data transmission process has been executed under a condition other than the coming of transmission timing, such as the execution of printing (S58: No), the controller 51 skips the processes of steps S59, S60, and S62 and ends the data transmission process.

After executing the process of step S57, S60 or S61, the controller 51 transmits an e-mail including the generated transmission data to the transmission address (S62). That is, the controller 51 transmits the e-mail including the generated transmission data to the information processing device 11.

Although not illustrated in the flowchart, the information processing device 11 receives the e-mail sent by the printer 10A through a mail server. The controller 61 of the information processing device 11 stores the empty information, the order information, and the remaining amount information included in the received e-mail in the memory 66. For example, in response to the order information being included in the received e-mail, the service provider ships the cartridge 13 of the model number indicated by the order information or arranges the shipment. For example, in response to the empty information being included in the received e-mail, the service provider confirms a delivery date on which the cartridge 13 arranged to be shipped will be delivered to the user, and notifies the user of the delivery date. The service provider checks, for example, the usage status of the printer 10 by the user based on the remaining amount information included in the received e-mail.

Next, a scan mail function of the printer 10 will be described. The scan mail function is a function of transmitting image data to a destination address which is an e-mail address designated by a user. That is, the printer 10 has a function of transmitting image data to the destination address designated by a user and a function of transmitting the transmission data to the transmission address designated by the service provider. The controller 51 executes each function so that the two functions are not confused. This will be described in detail below with reference to FIGS. 5B and 6A.

First, a scan mail process will be described with reference to FIG. 5B. Although not illustrated in the flowchart, the controller 51 causes the display 42 to display a standby screen when the printer 10 is powered on. Specifically, the controller 51 reads image data indicating the standby screen from the ROM 55 of the memory 53 and inputs the image data to the display 42. The ROM 55 stores the image data indicating the standby screen in advance.

Figure 7A:
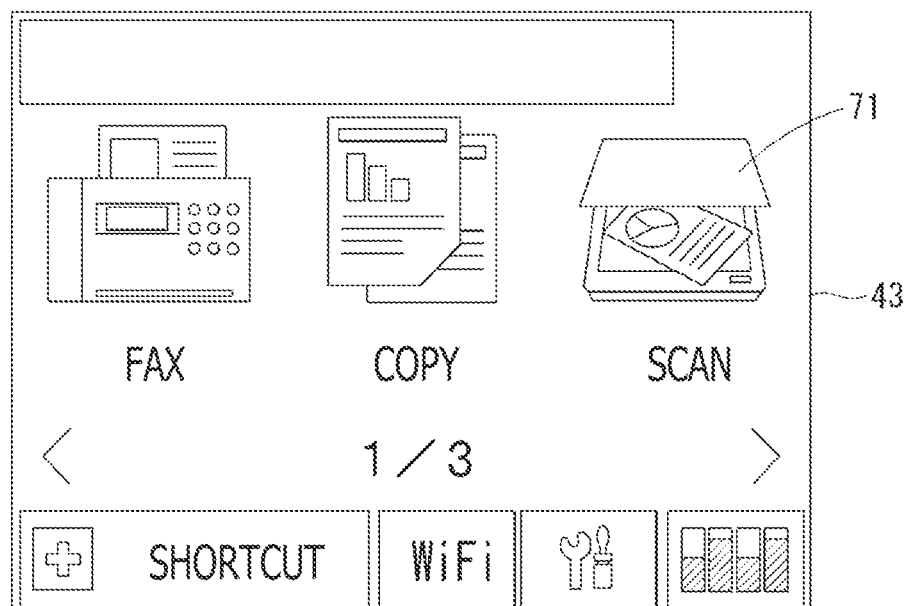
FIG. 7A is a diagram illustrating a standby screen.

As illustrated in FIG. 7A, the standby screen includes icons such as a "FAX" icon, a "COPY" icon, and a "SCAN" icon 71.

Figure 5A:
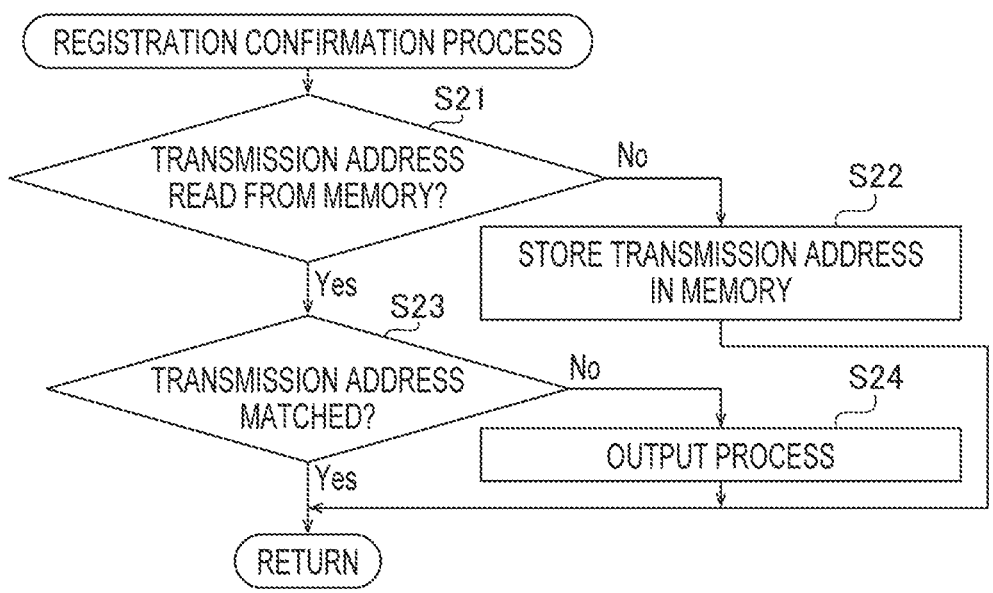
FIG. 5A is a flowchart of registration confirmation processing.
Figure 5B:
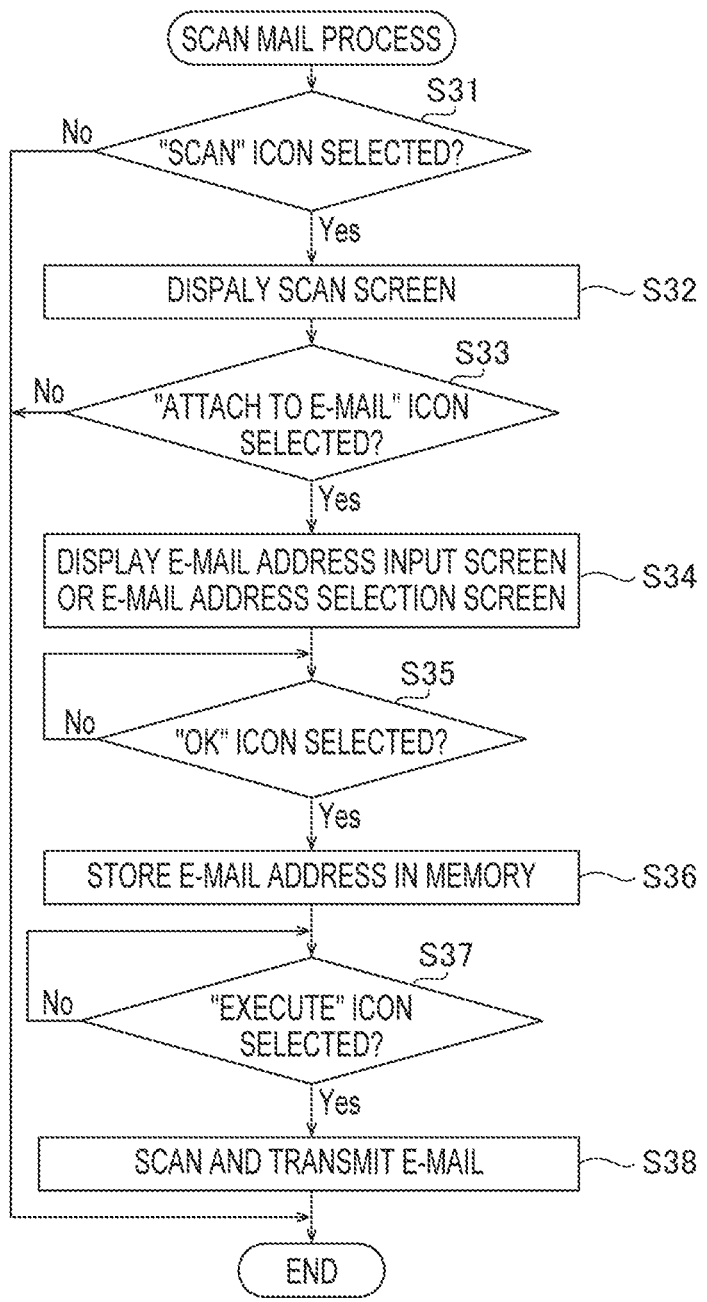
FIG. 5B is a flowchart of the scan mail process.
Figure 7B:
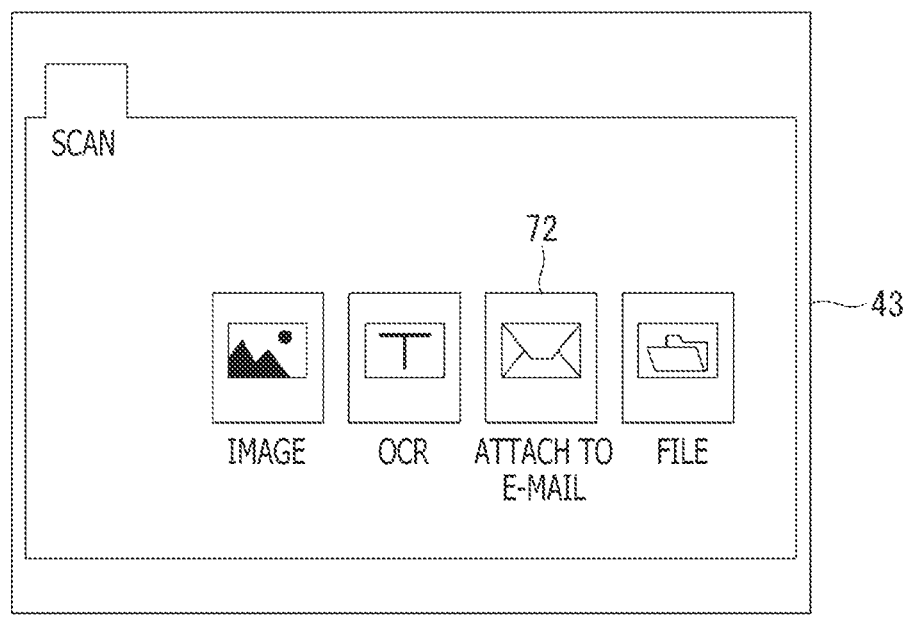
FIG. 7B is a diagram illustrating a scan screen.

As illustrated in FIG. 5B, the controller 51 determines whether or not the "SCAN" icon 71 has been selected on the standby screen (S31). When it is determined that the "SCAN" icon 71 has not been selected (S31: No), the controller 51 ends the scan mail process. When it is determined that the "SCAN" icon 71 has been selected (S31: Yes), the controller 51 causes the display 42 to display a scan screen (S32). Specifically, the controller 51 reads image data indicating the scan screen from the ROM 55 of the memory 53 and inputs the image data to the display 42. The ROM 55 stores the image data indicating the scan screen in advance. As shown in FIG. 7B, the scan screen includes an "IMAGE" icon, an "OCR" icon, an "ATTACH to E-MAIL" icon 72, and a "FILE" icon.

As shown in FIG. 5B, the controller 51 determines whether or not the "ATTACH TO E-MAIL" icon 72 has been selected on the scan screen (S33). When it is determined that the "ATTACH TO E-MAIL" icon 72 has not been selected (S33: No), the controller 51 ends the scan mail process. When it is determined that the "ATTACH TO E-MAIL" icon 72 has been selected (S33: Yes), the controller 51 causes the display 42 to display an e-mail address input screen or an e-mail address selection screen (S34). For example, the controller 51 causes the display 42 to display the e-mail address input screen when the destination address is not stored in the second storage area 57B of the EEPROM 57 in the memory 53. The controller 51 causes the display 42 to display the e-mail address selection screen when the destination address is stored in the second storage area 57B of the EEPROM 57 in the memory 53.

Specifically, the controller 51 reads image data indicating the e-mail address input screen from the ROM 55 of the memory 53 and inputs the image data to the display 42. Alternatively, the controller 51 reads image data indicating the e-mail address selection screen from the ROM 55 of the memory 53 and inputs the image data to the display 42. The ROM 55 stores in advance the image data indicating the e-mail address input screen and the image data indicating the e-mail address selection screen.

Figure 8A:
FIG. 8A is a diagram illustrating an e-mail address input screen.

As shown in FIG. 8A, the e-mail address input screen includes characters "INPUT E-MAIL ADDRESS" and a text box that displays the e-mail address input by the user using the touch sensor 44 and/or the operation switches 45. The e-mail address input screen includes an "OK" icon 73 and a "return" icon 74.

Figure 8B:
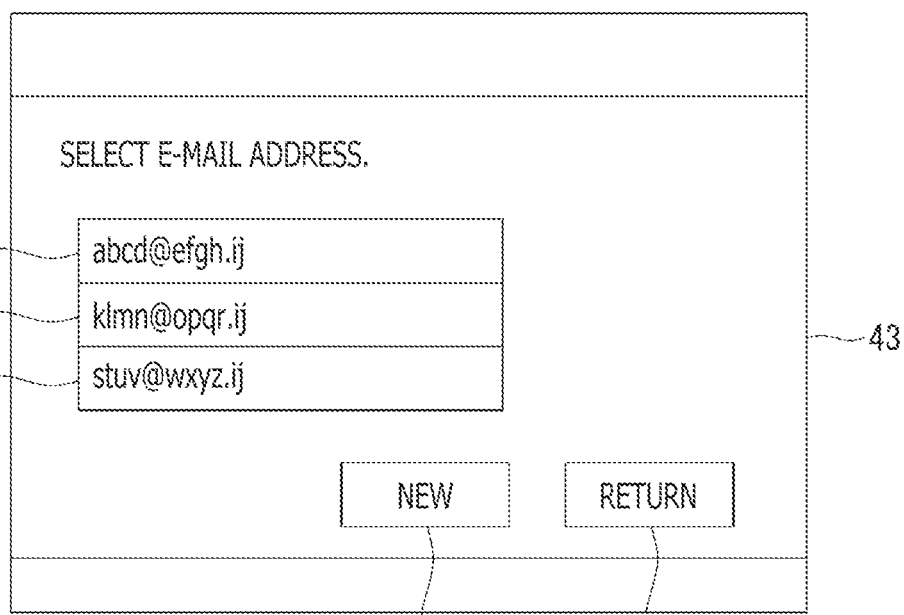
FIG. 8B is a diagram illustrating an e-mail address selection screen.

As shown in FIG. 8B, the e-mail address selection screen includes characters "SELECT E-MAIL ADDRESS" and a text box 75 for displaying the e-mail address stored in the second storage area 57B of the EEPROM 57. In the illustrated example, the e-mail address selection screen includes a text box 75 with "abcd@efgh.ij," a text box 75 with "klmn@opqr.ij", and a text box 75 with "stuv@wxyz.ij." The e-mail address selection screen also includes a "NEW" icon 76 and a "RETURN" icon 77.

Although not illustrated in the flowchart, the controller 51 receives the selection of the text box 75 on the e-mail address selection screen. The controller 51 displays a not-shown execution instruction screen on the display 42 in response to receiving the selection of the text box 75 on the e-mail address selection screen. Specifically, the controller 51 reads image data indicating the execution instruction screen from the ROM 55 of the memory 53 and inputs the image data to the display 42. The ROM 55 stores the execution instruction screen in advance. The execution instruction screen includes, for example, characters "WOULD YOU LIKE TO SEND THE SCANNED IMAGE BY E-MAIL?," an "EXECUTE" icon, and a "RETURN" icon. The controller 51 determines whether or not the "execute" icon has been selected on the execution instruction screen (S37).

On the other hand, when it is determined that the "NEW" icon 76 has been selected on the e-mail address selection screen, the controller 51 causes the display 42 to display the e-mail address input screen (S34). Then, the controller 51 determines whether or not the e-mail address has been input by using the touch sensor 44 and/or the operation switches 45 and the "OK" icon 73 has been selected on the e-mail address input screen (S35).

The controller 51 causes the display 42 to display the e-mail address input screen until the e-mail address is input and the "OK" icon 73 is selected (S35: No) or the "return" icon 74 is selected on the e-mail address input screen. When it is determined that the e-mail address is input and the "OK" icon 73 is selected (S35: Yes), the controller 51 stores the input e-mail address as the destination address in the second storage area 57B (FIG. 1) of the EEPROM 57 (S36). That is, the e-mail address input by the user is stored in the second storage area 57B of EEPROM 57, and the transmission address which is an e-mail address obtained by the controller 51 from the IC memory 15 is stored in the first storage area 57A of the EEPROM 57.

As described above, the controller 51 causes the display 42 to display, in the e-mail address selection screen, the destination address stored in the second storage area 57B of the EEPROM 57 instead of the first storage area 57A storing the transmission address. Therefore, the transmission address of the information processing device 11 will not be erroneously selected in the scan mail process, particularly in the E-mail address selection screen.

After storing the destination address in the second storage area 57B of the EEPROM 57 (S36), the controller 51 causes the display 42 to display the above-described execution instruction screen, and determines whether or not the "EXECUTE" icon has been selected on the execute instruction screen (S37). The controller 51 causes the display 42 to display the execution instruction screen until the "EXECUTE" icon is selected on the execution instruction screen (S37: No) or until the "RETURN" icon is selected. When it is determined that the "EXECUTE" icon has been selected on the execution instruction screen (S37: Yes), the controller 51 causes the reading sensor to read an image printed on a sheet while scanning the scanning device of the scanner 46 to generate image data (S38). Then, the controller 51 obtains the image data input from the reading sensor. The controller 51 transmits the obtained image data to the e-mail address selected on the e-mail address selection screen or to the e-mail address input by the user on the e-mail address input screen through the communication I/F 47 (S38).

Although not illustrated in the flowchart, the controller 51 receives an instruction to delete the destination address stored in the second storage area 57B of the EEPROM 57. For example, the controller 51 causes the display 42 to display a setting screen for receiving the instruction to delete the destination address on condition that the setting icon displayed on the standby screen is selected. Specifically, the controller 51 reads image data indicating the setting screen stored in the ROM 55 of the memory 53 and inputs the image data to the display 42. The setting screen includes, for example, the above-described text box (FIG. 8B) in which the destination address is displayed, characters "SELECT E-MAIL ADDRESS TO BE DELETED," an "OK" icon, and a "cancel" icon.

The controller 51 receives, input through the touch sensor 44 and/or the operation switches 45 selecting the text box 75 on the setting screen, and receives selection of the "OK" icon. In response to receiving the selection of the text box 75 and the selection of the "OK" icon on the setting screen, the controller 51 deletes the e-mail address indicated in the selected text box 75 from the second storage area 57B of the EEPROM 57. That is, the controller 51 receives an instruction from the user to store the destination address in the second storage area 57B of the EEPROM 57 (S36), and also receives an instruction from the user to delete the destination address from the second storage area 57B of the EEPROM 57.

Next, a transmission address update process executed by the controller 51 will be described with reference to FIG. 6A. The transmission address update process is executed when an operator inputs, to the printer 10, an update input being a command to execute a process for updating the transmission address in a case where the transmission address of the service provider has been changed.

First, the controller 51 determines whether or not the update input is input through the touch sensor 44 and/or the operation switches 45 (S41). Specifically, the service provider or an operator who has received an instruction from the service provider selects an icon displayed on the display 42 and/or operates the operation switches 45 to input the update instruction to the printer in a particular procedure. The particular procedure is not disclosed to the user by an instruction manual or the like, but is disclosed only to the service provider. That is, the update of the transmission address stored in the first storage area 57A of the EEPROM 57 cannot be performed by the user, and can be performed only by the service provider or an operator who received an instruction from the service provider.

When it is determined that the update input is not input through the touch sensor 44 and/or the operation switch 45 (S41: No), the controller 51 ends the transmission address update process. When it is determined that the update input is input (S41: Yes), the controller 51 shifts to a maintenance mode (S42). The maintenance mode is a mode for receiving a change of the transmission address stored in the first storage area 57A of the EEPROM 57. For example, the controller 51 stores a maintenance mode flag having a value of "ON" in the EEPROM 57 to shift to the maintenance mode. The initial value of the maintenance mode flag is "OFF." After a process of step S44 described later is executed, the maintenance mode flag having the value of "OFF" is stored in the EEPROM 57. That is, the maintenance mode flag is returned to "OFF" which is the initial value upon completion of the transmission address update process.

After shifting to the maintenance mode (S42), the controller 51 obtains a new transmission address (S43). For example, the operator mounts the cartridge 13 storing the new transmission address in the IC memory 15 in the mounting case 32. The controller 51 obtains the new transmission address from the IC memory 15 of the cartridge 13 mounted in the mounting case 32 through the cartridge I/F 49. Alternatively, the operator inputs the new transmission address to the printer 10 using the touch sensor 44 and/or the operation switches 45. The controller 51 obtains the new transmission address input through the touch sensor 44 and/or the operation switches 45. Alternatively, the operator inputs the new transmission address to the printer 10 through the communication I/F 47 by using a personal computer, a tablet, or a portable terminal. The controller 51 obtains the new transmission address input through the communication I/F 47.

The controller 51 overwrites the transmission address stored in the first storage area 57A of the EEPROM 57 with the obtained new transmission address (S44), and ends the transmission address update process. That is, the controller 51 updates the transmission address.

Effects of Embodiment

The controller 51 obtains the transmission address stored in the IC memory 15 of the cartridge 13 mounted in the mounting case 32 (S14: Yes), and stores the obtained transmission address in the EEPROM 57 of the memory 53 (S22). Therefore, the printer 10 can reduce time and duty of the user to input the transmission address to the printer 10 by using the touch sensor 44 and/or the operation switches 45.

The controller 51 stores the transmission address in the first storage area 57A of the EEPROM 57 and stores the destination address set by a user in the second storage area 57B of the EEPROM 57. Then, in response to determining that the "ATTACH TO E-MAIL" icon 72 has been selected (S33: Yes), the controller 51 causes the display 42 to display the E-mail address selection screen including the destination address stored in the second storage area 57B of the EEPROM 57 (S34). Therefore, when the user selects the "ATTACH TO E-MAIL" icon 72, the transmission address stored in the first storage area 57A of the EEPROM 57 is not displayed on the display 42, and the user is prevented from erroneously selecting the transmission address.

The controller 51 shifts to the maintenance mode only when the update input is received (S42), and updates the transmission address only in the maintenance mode (S44).

The procedure for inputting the update input to the printer 10 is information that is not disclosed to the user but is disclosed to the service provider. Therefore, it is possible to prevent the user from erroneously changing the transmission address.

In response to determining that the transmission address is not stored in the IC memory 15 but is stored in the memory 53 (S15: Yes), the controller 51 stores the transmission address stored in the memory 53 in the IC memory 15. Therefore, the service provider can store the transmission address in the IC memory 15 of the cartridge 13 by using the printer 10B owned by the service provider.

Modifications

In the above-described embodiment, the controller 51 overwrites the transmission address stored in the EEPROM 57 with the obtained new transmission address in the transmission address update process. In the present modification, an example will be described in which the controller 51 does not execute the transmission address update process but executes a process of updating the transmission address instead of the output process of step S24.

When it is determined that the transmission address obtained from the IC memory 15 of the cartridge 13 mounted in the mounting case 32 does not match the transmission address stored in the EEPROM 57 of the memory 53 (S23: Yes), the controller 51 updates the transmission address. Specifically, the controller 51 overwrites the transmission address stored in the EEPROM 57 with the transmission address obtained from the IC memory 15.

In this modification, the transmission address stored in the EEPROM 57 of the memory 53 can be updated with the new transmission address only by mounting the cartridge 13 having the IC memory 15 storing the new transmission address in the mounting case 32. That is, the service provider can update the transmission address stored in the EEPROM 57 with the new transmission address only by providing the user with the cartridge 13 having the IC memory 15 storing the new transmission address. As a result, it is possible to reduce duty of the operator to update the transmission address and duty of the service provider to arrange the operator.

Other Modifications

In the above-described embodiment, the transmission address is an e-mail address. However, the transmission address may be a URL, an IP address, or the like. Specifically, the information processing device 11 may be a server that discloses a URL on the Internet 12. In this case, the transmission address may be a URL disclosed by the information processing device 11 or an IP address of the information processing device 11 and, in the data transmission process illustrated in FIG. 6B, the printer 10A transmits an HTTP request including the generated transmission data to the transmission address.

In the above-described embodiment, the e-mail is used in the scan mail function to transmit image data to a destination designated by the user. However, a facsimile function may be used to transmit image data to a destination designated by the user. For example, the controller 51 stores a fax number input to the printer 10 by the user using the touch sensor and/or the operation switches 45 in a third storage area of the EEPROM 57. The third storage area is a storage area that can be recognized by the controller 51 while distinguishing from the first storage area 57A and the second storage area 57B. In response to the user selecting the "FAX" icon, the controller 51 causes the display 42 to display a fax number selection screen including the fax number stored in the third storage area.

In the above-described embodiment, the printer 10 transmits the e-mail including the remaining amount information, the order information and the empty information to the information processing device 11. However, the printer 10 may transmit an e-mail including failure information to the information processing device 11. For example, a sensor capable of detecting failures such as a paper jam is provided in the printer 10. Since the sensor is well known, detailed description thereof is herein omitted. When it is determined a failure occurred based on the detection signal input from the sensor, the controller 51 generates transmission data including failure information indicating the failure and the user ID. The failure information is stored in the ROM 55 of the memory 53 in advance. The controller 51 transmits the e-mail including the generated transmission data to the transmission address through the communication I/F 47.

In the above-described embodiment, the liquid level sensor 38 is used to detect the position of the liquid surface of the ink stored in the cartridge 13. However, any sensor may be used as long as it can detect a value that changes in accordance with the position of the liquid surface of ink stored in the cartridge 13. For example, an actuator that moves in accordance with the position of the liquid surface or a prism whose refractive index changes in accordance with the position of the liquid surface may be positioned on the optical path of the liquid level sensor 38 instead of the liquid surface of the cartridge 13.

Hereinabove, the illustrative embodiments according to aspects of the present disclosure have been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only exemplary illustrative embodiments of the present disclosure and but a few examples of their versatility are shown and described in the present disclosure. It is to be understood that the present disclosure is capable of use in various other combinations and environments and is capable of changes or modifications within the scope of the inventive concept as expressed herein.

The printer 10 in the above-described embodiment is an example of an image recording device according to aspects of the present disclosures. The touch sensor 44 and the operation switch 45 in the above-described embodiment are examples of a user interface according to aspects of the present disclosures. The mounting case 32 in the above-described embodiment is an example of a cartridge mount according to aspects of the present disclosures. The ink and toner in the above-described embodiment are examples of a consumable according to aspects of the present disclosures. The IC memory 15 in the above-described embodiment is an example of a cartridge memory according to aspects of the present disclosures. The print engine 40 in the above-described embodiment is an example of a print engine according to aspects of the present disclosures, and the print engine includes at least the recorder 29. The first storage area 57A in the above-described embodiment is an example of a particular storage area according to aspects of the present disclosures. The Outflow of ink from the head 34 in the above-described embodiment, such as ejection of ink droplets from the head 34 and suction of ink from the head 34 and suction of ink from the head 34, is an example of consumption of a consumable according to aspects of the present disclosures. The empty information in the above-described embodiment is an example of status information indicating a state of the print engine according to aspects of the present disclosures. The first transmission data, the second transmission data and the third transmission data in the above-described embodiment are examples of notification information. The user ID included in the first transmission data, the second transmission data and the third transmission data in the above-described embodiment is an example of transmission source data according to aspects of the present disclosures. the scan mail function and the facsimile function in the above-described embodiment and modification are examples of an image data transmission function, and the e-mail address and the fax number in above-described embodiment and modification are examples of the transmission address according to aspects of the present disclosures.

What is claimed is:

1. An image recording device comprising a cartridge mount to which a cartridge is mounted, a cartridge interface, a memory, a communication interface configured to communicate with an external device via a network, a print engine configured to execute printing, and a controller,
    wherein the controller is configured to:
        obtain a transmission address associated with the external device stored in a cartridge memory of the cartridge through the cartridge interface;
        store the obtained transmission address in the memory;
        obtain, from the memory, notification information including at least one from a group of remaining amount information indicating a remaining amount of consumable in the cartridge mounted to the cartridge mount, order information indicating an order for the cartridge and status information indicating a state of the print engine, and transmission source information, the transmission source information indicating an identifier associated with the notification information; and
        transmit the obtained notification information and the obtained transmission source information to the external device associated with the obtained transmission address through the communication interface.

2. The image recording device according to claim 1 further comprising a display panel and a user interface,
    wherein the memory includes a first storage area configured to store the transmission address and a second storage area configured to store a destination address different from the transmission address, and
    wherein the controller is configured to:
        store the destination address input through the user interface in the second storage area of the memory;
        receive a selection of an image data transmission function through the user interface;
        cause the display panel to display the destination address stored in the second storage area and enable selection of the destination address displayed on the display panel through the user interface in response to receiving the selection of the use of the image data transmission function; and
        transmit image data to the destination address stored in the second storage area of the memory through the communication interface in response to the selection of the destination address.

3. The image recording device according to claim 1 further comprising a user interface,
    wherein the controller is configured to:
        receive an update input being a command to execute a process for updating the transmission address through the user interface;
        shift to a maintenance mode in response to receiving the update input; and
        make the transmission address stored in the memory editable through the user interface.

4. The image recording device according to claim 1,
    wherein the controller is configured to:
        determine whether or not the transmission address has already been stored in the memory in response to obtaining the transmission address from the cartridge memory through the cartridge interface;
        store the transmission address obtained from the cartridge memory in the memory in response to determining that the transmission address is not stored in the memory; and
        store the transmission address obtained from the cartridge memory in a particular storage area of the memory configured to store the transmission address in response to determining that the transmission address has already been stored in the memory and in a case where the transmission address already stored in the memory is different from the transmission address obtained from the cartridge memory.

5. The image recording device according to claim 1,
    wherein the controller is configured to:
        determine whether or not the transmission address is stored in the cartridge memory through the cartridge interface;
        determine whether or not the transmission address is stored in the memory; and
        store the transmission address stored in the memory in the cartridge memory in response to determining that the transmission address is not stored in the cartridge memory but is stored in the memory.

6. The image recording device of claim 1, wherein the transmission address is an e-mail address.

7. The image recording device of claim 1, wherein the external device is a server provided by a service provider.

8. The image recording device of claim 7, wherein the image recording device receives a service from the service provider.

9. A non-transitory computer-readable medium storing computer-readable instructions configured to, when executed by a controller of an image recording device comprising a cartridge mount to which a cartridge is mounted, a cartridge interface, a memory, a communication interface configured to communicate with an external device via a network, and a print engine configured to execute printing, cause the controller to:
    obtain a transmission address associated with the external device stored in a cartridge memory of the cartridge through the cartridge interface;
    store the obtained transmission address in the memory;
    obtain, from the memory, notification information including at least one from a group of remaining amount information indicating a remaining amount of consumable in the cartridge mounted to the cartridge mount, order information indicating an order for the cartridge and status information indicating a state of the print engine, and transmission source information, the transmission source information indicating an identifier associated with the notification information; and transmit the obtained notification information and the obtained transmission source information to the external device associated with the obtained transmission address through the communication interface.

\* \* \* \* \*